July 14, 1964

G. RAFFO 3,141,157

ANALOG-TO-DIGITAL CONVERTER

Filed Feb. 16, 1960

INVENTOR
GIANFRANCO RAFFO
BY
Kenyon & Kenyon
ATTORNEYS 3,141,157

ANALOG-TO-DIGITAL CONVERTER

Gianfranco Raffo, Milan, Italy, assignor to Ing. C. Olivetti & C., S.p.A., Ivrea, Italy, a corporation of Italy Filed Feb. 16, 1960, Ser. No. 9,132
Claims priority, application Italy Feb. 20, 1959
1 Claim. (Cl. 340—347)

The present invention relates to analog-to-digital converters which are used in data handling systems to provide a digital representation of an analog quantity.

In conventional analog-to-digital converters a reference quantity having a known variable digital value is compared by means of a suitable comparator with the analog quantity to be converted. By detecting the digital value of the reference quantity when the comparator signals that the two quantities are equal a digital representation of the analog quantity is obtained. The reference quantity is provided by a suitable summation network associated with an electronic pulse counter fed with a series of counting pulses until the stepwise variable reference quantity reaches the actual value of the analog quantity. Then a signal generated by the comparator stops the counter, whose contents represents the digital value of the analog quantity.

To compare the reference quantity with the analog quantity vacuum tube comparators are generally used, which require delicate and expensive circuitry.

Other known converters use magnetic core comparators, on which the analog and reference quantities act as magnetomotive forces, said cores being excited by an A.C. signal so as to provide a symmetrical output when the two quantities balance each other, means responsive to the asymmetry of said output being provided to cause said counter to count toward re-establishment of balance. These comparators require delicate asymmetry detectors as well as complicated circuitry to control the counter.

Another known converter comprises a set of magnetic cores having a substantially rectangular hysteresis loop, a first winding coupled to said cores and carrying the analog input current and having a different number of turns on each core and a second winding coupled to all the cores and carrying a series of pulses opposing the magnetomotive force of the analog current, whereby for each value of the analog current a predetermined core repeatedly switches from one state of saturation to the opposite state in order to manifest said value. This converter requires pulses having accurately adjusted amplitude and, moreover, it does not provide an output suitable for data handling purposes.

Furthermore, the operation of all the aforementioned converters is affected by the variation in the magnetic properties of the cores.

The object of the present invention is to overcome the above disadvantages and to provide a simple and inexpensive analog-to-digital converter having great stability and long life.

The analog-to-digital converter according to the invention comprises means for generating a variable reference current having a known digital value, means for producing an analog current to be compared with said reference current, a bistable magnetic core adapted to be switched from one state to an opposite state, winding means coupled to said core and fed by said reference and analog currents, the magnetomotive forces respectively induced by said currents being adapted to drive said core toward opposite states, and means responsive to the switching of said core when the magnetomotive force induced by one of said currents overcomes the magnetomotive force induced by the other current for manifesting the instant digital value of said reference current.

The novel features of the present invention will become apparent from the following description of a preferred embodiment thereof taken in conjunction with the accompanying drawings, wherein.

Figure 1:
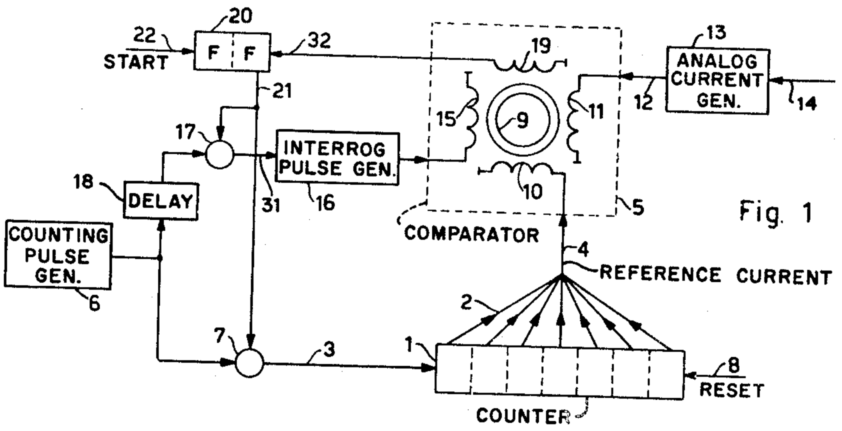
FIG. 1 shows a schematic diagram of the analog-to-digital converter according to the invention.

Numeral 1 (FIG. 1) indicates a binary counter, made for example of a chain of seven flip-flops, each one having an output terminal 2. The counter 1 is fed via the line 3 by counting pulses, whereby a series of 128 pulses causes the counter to sequentially assume all its possible configurations, thus sequentially providing a binary representation of the decimal numbers from 0 to 127.

Each flip-flop when in the state "1" gives on the corresponding output terminal 2 a current having a value dependent on the position of the flip-flop within the counter, whereby, assuming the first flip-flop gives a current of one unit, the second flip-flop will give two current units, the third flip-flop will give four current units, and so on up to the seventh flip-flop which will give 64 current units.

The seven output leads 2 of the counter 1 are connected to the input 4 of a comparator 5 in such a way that the current at the input 4 is the sum of the currents generated on the output terminals 2 of the seven flip-flops. Therefore, a stepwise variable current is generated at the input 4 under the control of the counter 1, said current having a magnitude depending upon the count of the counter, and providing a variable reference quantity having successive known digital values represented by said count.

A suitable pulse generator 6 connected to the input 3 of the counter 1 acts as a source of periodic counting pulses for the counter, an "and" gate 7 being interposed between the source and the counter. Further the counter 1 may be reset by a pulse sent to the input 8.

The comparator 5 comprises a core 9 of magnetic material having a substantially square hysteresis loop and acting as a bistable element having a state "0" and a state "1" and being adapted to be switched from one state to the opposite state.

The core 9 is inductively coupled to four windings 10, 11, 15 and 19. A first input or comparative winding 10 is connected to the output 4 of the counter 1 and is fed by the reference current.

A second input or biasing winding 11 is connected to the output 12 of a current generator 13, said generator being responsive to the analog quantity fed to the input 14 for producing an analog current having a magnitude depending upon the value of said quantity. The analog input current feeding the winding 11 biases the core 9 toward the state "0," for instance.

A third interrogation winding 15 is periodically excited by interrogation pulses produced by suitable impulsive excitation means including delay means, said exciting means comprising a pulse generator 16 controlled via a delay circuit 18 and an "and" gate 17 by the counting pulses generated by the generator 6, whereby each counting pulse feeding the input terminal 3 of the counter 1 is followed by an interrogation pulse exciting the winding 15.

A fourth output winding 19 is connected to the input 32 of a flip-flop 20, whose output 21 controls the gates 7 and 17. A pulse induced in the output winding 19 responsive to the switching of the core from the state "1" to the state "0" deenergizes the output 21 of the flip-flop 20, thus inhibiting the gates 7 and 17. On the contrary, a pulse supplied to the input 22 of the flip-flop energizes the output 21, thus energizing said gates.

The sense of the windings 10, 11 and 15 is such that in the core 9 both the analog biasing M.M.F. and the interrogation M.M.F. oppose the reference M.M.F., which drives the core towards the state "1," for instance.

The number of turns of the input windings 10 and 11 is such that the maximum value of the analog M.M.F. induced by the winding 11 balances the M.M.F. produced by 128 current units flowing through the winding 10.

The operation of the analog-to-digital converter will now be described with reference to a typical sampling cycle.

It will be assumed that the core 9 is normally in the state "0."

Suppose that the analog quantity produces an analog M.M.F. biasing the core 9 to the state "0" and having a value between two and three units. Therefore, as no other winding is initially energized, the core is maintained in the normal state "0."

After resetting the counter 1 and thus deenergizing the outputs 2, a starting signal is fed to the input 22, whereby the gates 7 and 17 are energized.

The first counting pulse generated by the generator 6 causes the counter 1 to count one thus energizing the first output 2, whereby the reference winding 10 produces a M.M.F. of one unit. Since this reference M.M.F. does not overcome the analog biasing M.M.F., the core 9 remains in the state "0."

Thereupon the same counting pulse generated by the generator 6 and delayed by the circuit 18 energizes the interrogation generator 16 which produces a pulse exciting the winding 15. As the core 9 is in the state "0," the interrogation M.M.F. thus produced does switch the core, whereby no output pulse is induced in the winding 19.

The second counting pulse causes the counter 1 to count one, thus energizing the second output 2 and deenergizing the first output 2, whereby the winding 10 produces a M.M.F. of two units. Since this reference M.M.F. does not overcome the analog biasing M.M.F., the core 9 still remains in the state "0," whereby the next interrogation pulse does not produce an output signal in the winding 19.

The third counting pulse causes the counter to count one, thus energizing the first output 2 and maintaining the second output 2 also energized, whereby the winding 10 produces a M.M.F. of three units. As this reference M.M.F overcomes the analog biasing M.M.F., the core 9 switches to the state "1," and subsequently it is restored to the state "0" by the next interrogation pulse, thus producing an output pulse in the winding 19 effective to trigger the flip-flop 20 and to inhibit the gates 7 and 17. Therefore, the counter 1 stops under the control of the output winding 19, and by manifesting the instant digital value of the reference current it provides an approximate digital representation of the analog quantity actually supplied to the input 14. After the counter has thus been set according to the digital representation of the analog quantity, any known means may be used to read out said digital representation, the sampling cycle being thus finished.

If thereupon the analog quantity is to be sampled again, a new sampling cycle is started by feeding a reset pulse and a start pulse to the inputs 8 and 22, respectively. Said reset pulse may be periodically supplied by any known means, and thus the converter may be arranged to operate in sequential cycles to periodically sample the analog quantity.

One unit of M.M.F. will suitably be two or three times greater than the coercive force of the core 9.

Figure 2:
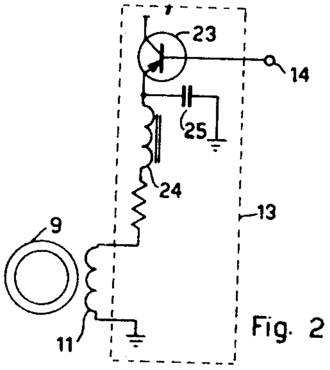

The detailed circuits shown in FIGS. 2, 3 and 4 will now be described.

The generator 13 (FIG. 1) feeding the winding 11 with an analog current proportional to the analog quantity comprises a transistor amplifier 23 (FIG. 2) whose base electrode is connected to the analog input 14 and whose emitter electrode is connected to the winding 11 through a choke 24 and is grounded through a condenser 25.

Figure 3:
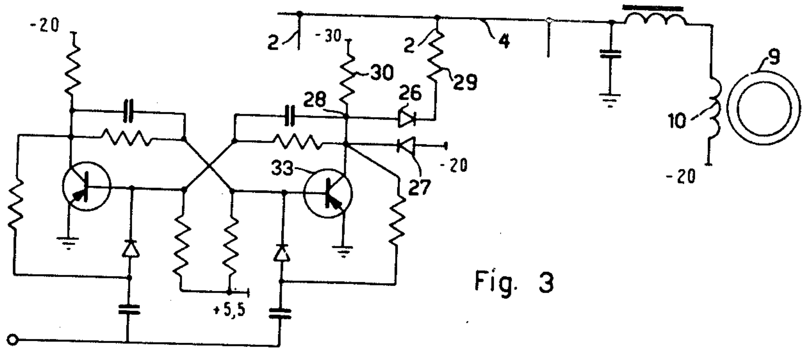
FIGS. 2 to 4 show the detailed circuits of some elements used in the converter according to FIG. 1.
Figure 4:
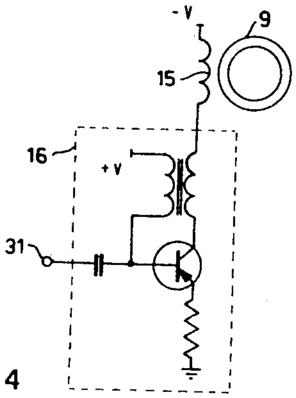

FIG. 3 shows a generical transistor flip-flop of the counter 1. A diode 26 is used to separate the flip-flop from the winding 10 when the right-hand transistor 33 is cut off, in order to prevent unwanted current from flowing through said winding. Under these conditions the diode 27 conducts, thus determining the potential of the collector 28 and blocking the diode 26. On the contrary, when the right-hand transistor 33 conducts, the winding 10 carries a current having the above referred value determined by a resistance 29 and dependent upon the position of the flip-flop within the counter.

The interrogation pulse generator 16 may be of the conventional monostable transistor blocking oscillator type (FIG. 4) with transformer feedback between base and collector, said blocking oscillator being responsive to triggering pulses fed to the terminal 31 in order to supply square pulses to the winding 15.

What I claim is:

In a device for setting up a digital representation of an input analog current, a unidirectional counter settable according to said representation, a source of counting pulses for setting said counter, gating means interposed between said source and said counter, means controlled by said counter for generating a unidirectional reference current having a step-wise increasing magnitude depending upon the count of said counter, a bi-stable magnetic core, a first winding on said core fed by said reference current for driving said core toward a predetermined state, a second winding on said core fed by said input analog current for driving said core toward an opposite state, said core being switched from said opposite state to said predetermined state when the magnetizing force applied by said reference current overcomes the magnetizing force applied by said input analog current, a third winding on said core, impulsive excitation means for said third winding including delay means and responsive to each one of said counting pulses for driving said core toward said opposite state, and a fourth winding on said core responsive to the switching of said core from said predetermined state to said opposite state to inhibit said gating means.

References Cited in the file of this patent

UNITED STATES PATENTS

| | | |
|---|---|---|
| 2,828,482 | Schumann | Mar. 25, 1958 |
| 2,962,704 | Buser | Nov. 29, 1960 |